Figure 1:
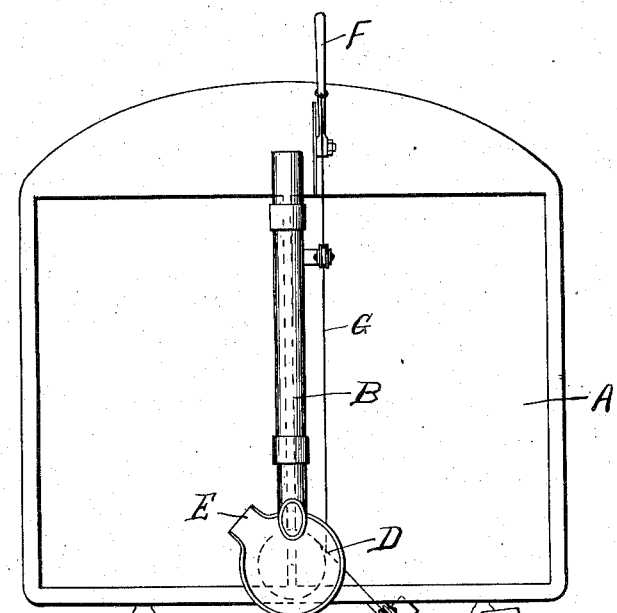

A. DICKSON.
TREATMENT AND UTILIZATION OF SEWAGE AND DISTILLERY OR BREWERY WASH OR WASTE.
APPLICATION FILED NOV. 30, 1910.

1,015,302. Patented Jan. 23, 1912.

Witnesses:

Inventor.
Alexander Dickson,
by B. Singer,
Atty.

UNITED STATES PATENT OFFICE.

ALEXANDER DICKSON, OF DUBLIN, IRELAND.

TREATMENT AND UTILIZATION OF SEWAGE AND DISTILLERY OR BREWERY WASH OR WASTE.

1,015,302.  Specification of Letters Patent.  Patented Jan. 23, 1912.

Application filed November 30, 1910. Serial No. 594,956.

*To all whom it may concern:*

Be it known that I, ALEXANDER DICKSON, of 15 Parliament street, Dublin, Ireland, have invented new and useful Improvements Relating to the Treatment and Utilization of Sewage and Distillery or Brewery Wash or Waste; and I do hereby declare that the following is a full, clear, and exact description of the same.

This invention has reference to the treatment and utilization of refuse such as sewage and distillery or brewery wash or waste and has for its object improved means whereby the organic and nitrogenous matters contained in such refuse may be separated therefrom so as to render them capable of being usefully employed.

In the treatment of distillery or brewery wash or waste the nitrogenous matter separated therefrom may be employed as a fertilizer or manure.

In carrying my invention into practice the separation of the nitrogenous matter is effected by adding to the sewage or to the distillery waste about one half per cent. of brewers yeast preferably at a temperature of about 65 degrees Fahrenheit. In treating sewage the fermentation thus set up separates the nitrogenous matter in the sludge from the sand and liquor and forces it to the top from whence it may be collected and utilized for various purposes. The treatment of the sewage or thin mixture and the sewage sludge which is a little thicker in consistency is the same, but the preference is to work with the sludge. In the case of creamy sewage the mixture is afterward passed through phosphate of lime or some substance such as basic slag or bone-ash, in order to neutralize the acidity—which arrests any further decomposition. The acids usually found are lactic, acetic and butyric acids. Fine coal may be mixed with the separated material from the sewage sludge and pressed into briquets which may be used for heating purposes and gas distillation with recovery of ammonia. The proportion of yeast necessary is about one half per cent. of the sewage sludge used. About 10 cwt. ordinary brewers yeast would be added to 100 tons sewage sludge in a tank and allowed to remain for about 48 hours; the organic portion is then found at the top and can be readily taken off and utilized. In making briquets one third of fine coal is mixed with two thirds of the separated material from the sludge and pressed into shape in any convenient manner.

The treatment of distillery wash or waste is effected in substantially the same manner, that is to say, a quantity of yeast in the proportions above indicated is added to the mixture after which it is agitated and allowed to stand until the nitrogenous matters are precipitated at the bottom of the tank. The liquid is then run through tricalcium phosphate in order to neutralize its acidity so that the liquid may be run to any outlet stream or river without injury to fish or the like. The tricalcium phosphate does not become dissolved so as to pass off to any extent with the effluent but settles as a mass which may be collected and may be easily dried and used as a fertilizer.

A form of apparatus suitable for use in effecting the present process, is shown by way of example in the accompanying drawing, in which:—

Figure 2:
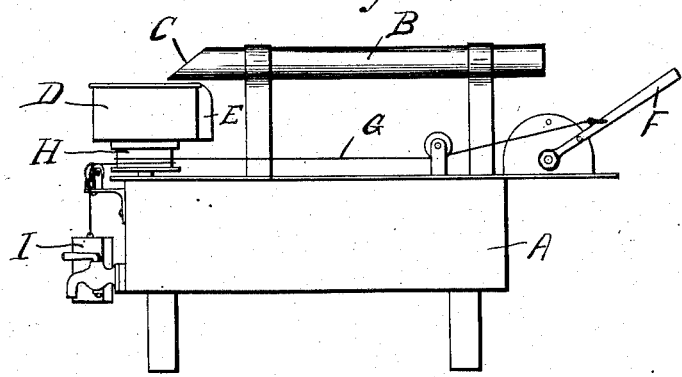

Figure 1 is a top plan view of the apparatus, and Fig. 2 is a side elevation of the same.

Referring particularly to the drawing, A indicates a tank, which in practice has a large capacity, say about 100 tons of sewage, above which a pipe B is disposed through which sewage or distillery wash may be conveyed to the tank A. Disposed immediately below the outlet C of pipe B is a drum D having a spout E, said drum being capable of rotation, so as to direct the sewage, or other liquid to be treated, into the tank A, or so as to direct the liquid to a point without the tank A, such as a drain or stream, of any description. The drum may be revolved by means of a lever F which operates a cord G running to, and connected with, a pulley H, which is connected with the drum, tension being applied to the cord by means of a weight I. Outlets K are disposed in the lower part of the tank so as to remove any portion of the liquid desired. The tank A is preferably divided into two sections, into which the drum D may direct the fluids to be treated in the manner desired, by virtue of its capability of rotation.

I claim:

1. The process of separating the nitrogenous matter from sewage and other waste liquids containing organic matter, which consists in adding brewer's yeast to the liquid to be treated, agitating the mixture, allowing the mixture to stand until the said nitrogenous matter is separated, and finally removing the nitrogenous matter from the liquid.

2. The process of separating the nitrogenous matter from sewage and distillery wash, which consists in adding brewer's yeast to the said liquids, allowing the mixture to stand until the said nitrogenous matter is separated, and finally removing the nitrogenous matter from the liquid.

3. The process of separating the nitrogenous matter from sewage and other waste liquids containing organic matter which consists in adding approximately one-half per cent. of brewer's yeast to the liquid to be treated, agitating the mixture, allowing the mixture to stand until the said nitrogenous matter is separated, and finally removing the nitrogenous matter from the liquid.

4. The process of treating sewage and other waste liquids containing organic matter which consists in adding brewer's yeast to the liquid to be treated, agitating the mixture, allowing the mixture to stand until the said nitrogenous matter is separated, removing the said nitrogenous matter from the liquid, treating the liquid with phosphate of calcium, and removing the phosphate of calcium from the liquid.

Dated this 15th day of November 1910.

In witness whereof I affix my signature in presence of two witnesses.

ALEXANDER DICKSON.

Witnesses:
A. G. DICKSON,
J. M. HALLIGAN.